US012608045B2

(12) United States Patent
Wu et al.

(10) Patent No.: US 12,608,045 B2
(45) Date of Patent: Apr. 21, 2026

(54) COUPLING BETWEEN A COMPUTING MODULE AND A COVER STRUCTURE OF AN INFORMATION HANDLING SYSTEM

(71) Applicant: Dell Products L.P., Round Rock, TX (US)

(72) Inventors: Jing-Tang Wu, New Taipei City (TW); Tung-Yi Chen, New Taipei City (TW); Kang-Wei Fan, Taoyuan City (TW)

(73) Assignee: Dell Products L.P., Round Rock, TX (US)

( * ) Notice: Subject to any disclaimer, the term of this patent is extended or adjusted under 35 U.S.C. 154(b) by 369 days.

(21) Appl. No.: 18/168,031

(22) Filed: Feb. 13, 2023

(65) Prior Publication Data

US 2024/0272674 A1    Aug. 15, 2024

(51) Int. Cl.
| | |
|---|---|
| *G06F 1/16* | (2006.01) |
| *G06F 1/183* | (2026.01) |
| *G06F 1/187* | (2026.01) |
| *G06F 1/188* | (2026.01) |
| *G11B 33/12* | (2006.01) |

(52) U.S. Cl.
CPC .......... *G06F 1/1635* (2013.01); *G06F 1/1658* (2013.01); *G06F 1/1683* (2013.01); *G06F 1/183* (2013.01); *G06F 1/187* (2013.01); *G06F 1/188* (2013.01); *G11B 33/123* (2013.01); *G11B 33/124* (2013.01)

(58) Field of Classification Search
CPC .... G06F 1/1635; G06F 1/1656; G06F 1/1658; G06F 1/1679; G06F 1/1683; G06F 1/183; G06F 1/184; G06F 1/185; G06F 1/186; G06F 1/187; G06F 1/188; H05K 7/1417; H05K 7/1418; H05K 7/142; H05K 5/0217; G11B 33/08; G11B 33/123; G11B 33/124; H01M 50/20; H01M 50/202; H01M 50/204; H01M 50/209
USPC ....................................................... 361/679.55
See application file for complete search history.

(56) References Cited

U.S. PATENT DOCUMENTS

| | | | | | |
|---|---|---|---|---|---|
| 5,192,143 | A | * | 3/1993 | Lajara ..................... | G06F 1/187 403/381 |
| 5,481,431 | A | * | 1/1996 | Siahpolo ................ | G11B 33/08 |
| 5,568,357 | A | * | 10/1996 | Kochis .................. | G06F 1/1626 361/679.34 |
| 5,641,296 | A | * | 6/1997 | Larabell .......... | H01R 13/62933 |
| 5,668,697 | A | * | 9/1997 | Dowdy ................ | G11B 33/128 |
| 6,292,455 | B1 | * | 9/2001 | Saruwatari ........... | G11B 25/043 |
| 6,882,528 | B2 | * | 4/2005 | Chuang .................. | G11B 33/08 720/651 |

(Continued)

*Primary Examiner* — Gage Crum
(74) *Attorney, Agent, or Firm* — McDermott Will & Schulte LLP

(57) ABSTRACT

An information handling system, including a cover structure including a plurality of coupling members positioned on a surface of the cover structure, each of the coupling members defining a cavity; and a computing module having a perimeter and including a plurality of protruding members positioned on the perimeter, wherein each of a subset of the plurality of protruding members corresponds to a respective coupling member of the plurality of coupling members, wherein, when the computing module is coupled to the cover structure, each of subset of the plurality of protruding members is positioned with the cavity of the corresponding coupling member of the plurality of coupling members to maintain a positioning of the computing module with respect to the cover structure.

17 Claims, 19 Drawing Sheets

(56)                References Cited

U.S. PATENT DOCUMENTS

| | | | | |
|---|---|---|---|---|
| 6,999,307 B2 * | 2/2006 | Peng | G06F 1/187 | 361/679.33 |
| 7,178,855 B2 * | 2/2007 | Catron | B60J 5/0468 | 24/297 |
| 7,188,815 B2 * | 3/2007 | Peterson | F16L 3/223 | 24/297 |
| 8,009,416 B2 * | 8/2011 | Kang | G06F 1/187 | 361/679.33 |
| 8,070,125 B2 * | 12/2011 | Sun | G11B 33/08 | 360/99.15 |
| 8,289,693 B2 * | 10/2012 | Li | G06F 1/187 | 720/689 |
| 8,405,968 B2 * | 3/2013 | Chen | G11B 33/124 | 361/679.33 |
| 8,456,831 B1 * | 6/2013 | Pang | G06F 1/187 | 248/221.11 |
| 8,582,287 B2 * | 11/2013 | Nguyen | G11B 33/124 | 211/126.6 |
| 8,584,999 B2 * | 11/2013 | Liu | G06F 1/187 | 248/222.12 |
| 9,891,673 B2 * | 2/2018 | Lee | G06F 1/1613 | |
| 10,114,429 B1 * | 10/2018 | Shih | G11B 33/128 | |
| 10,499,529 B1 * | 12/2019 | Hu | H05K 7/1401 | |
| 2005/0237709 A1 * | 10/2005 | Huang | G11B 33/124 | |
| 2007/0263351 A1 * | 11/2007 | Ho | G11B 33/08 | |
| 2008/0193829 A1 * | 8/2008 | Lu | H01M 50/209 | 429/100 |
| 2011/0103000 A1 * | 5/2011 | Sun | G11B 33/124 | 248/225.11 |
| 2013/0039014 A1 * | 2/2013 | Chen | G11B 33/128 | 361/726 |
| 2014/0321068 A1 * | 10/2014 | Okutsu | H04N 5/64 | 361/728 |
| 2019/0281729 A1 * | 9/2019 | Inagaki | H01L 23/427 | |
| 2020/0273498 A1 * | 8/2020 | Wakayama | G06F 1/187 | |

* cited by examiner

COUPLING BETWEEN A COMPUTING MODULE AND A COVER STRUCTURE OF AN INFORMATION HANDLING SYSTEM

BACKGROUND

Field of the Disclosure

The disclosure relates generally to an information handling system, and in particular, a coupling between a computing module and a cover structure of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in an information handling system, including a cover structure including a plurality of coupling members positioned on a surface of the cover structure, each of the coupling members defining a cavity; and a computing module having a perimeter and including a plurality of protruding members positioned on the perimeter, wherein each of a subset of the plurality of protruding members corresponds to a respective coupling member of the plurality of coupling members, wherein, when the computing module is coupled to the cover structure, each of sub set of the plurality of protruding members is positioned with the cavity of the corresponding coupling member of the plurality of coupling members to maintain a positioning of the computing module with respect to the cover structure.

Other embodiments of these aspects include corresponding systems and apparatus.

These and other embodiments may each optionally include one or more of the following features. For instance, each coupling member of the plurality of coupling members include a first member and a second member, the first member positioned opposite to the second member, the first member and the second member extending from the cover structure, wherein the first member includes a first projection and the second member includes a second projection, the first projection facing the second projection. When the computing module is coupled to the cover structure, each of subset of the plurality of protruding members is positioned within the cavity of the corresponding coupling member of the plurality of coupling members and between the first projection of the first member and the second projection of the second member of the corresponding coupling member. For each protruding member positioned within the cavity of the corresponding coupling member, the first projection of the first member and the second projection of the second member maintain the positioning of the protruding member within the cavity. Each protruding member includes a respective head positioned on a respective cylindrical member, wherein a distance between the first projection of the first member and the second projection of the second member is less than a diameter of the head of the projection. The first member and the second member are flexible. The computing module is a battery. A holder structure that is removable coupleable to the computing module. The holder includes a plurality of notches along a first side of the holder structure, wherein when the holder structure is coupled to the computing module, the plurality of notches are coupled to one or more of the protruding members. Each of the protruding members includes a respective head positioned on a respective cylindrical member, the head having a first diameter greater than a second diameter of the cylindrical member, wherein when the holder structure is coupled to the computing module, the holder structure is coupled between the head of a subset of the protruding members and the computing module. The holder structure includes a plurality of tabs having a first body extending from a surface of the holder structure. A subset of the plurality of tabs further include a second body extending perpendicular from the first body. A pitch between each of the plurality of protruding members is substantially the same.

The details of one or more embodiments of the subject matter described in this specification are set forth in the accompanying drawings and the description below. Other potential features, aspects, and advantages of the subject matter will become apparent from the description, the drawings, and the claims.

3

Figure 7A:
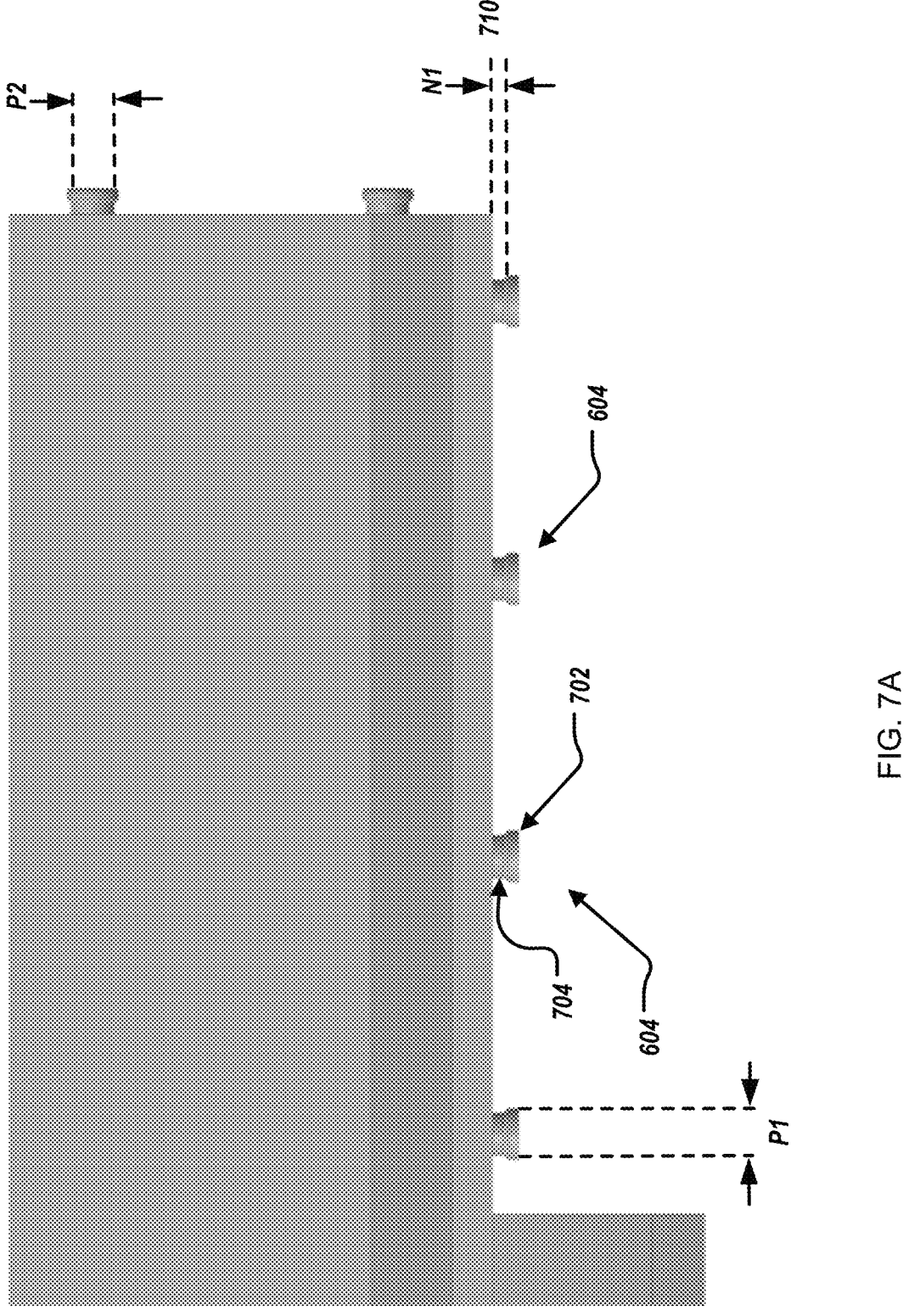

FIG. 7A illustrates a close-up top-down perspective of a portion of the computing module.

Figure 7B:
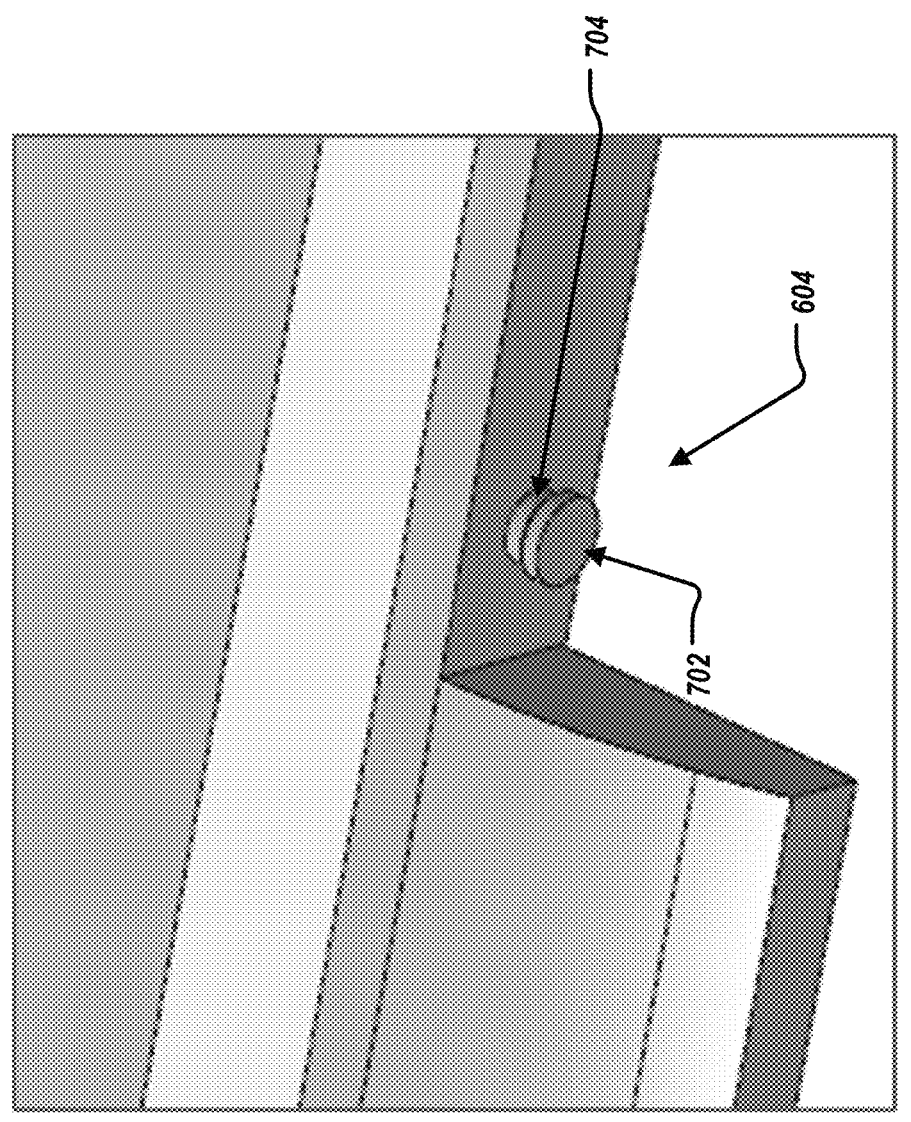

FIG. 7B illustrates a close-up perspective view of the computing module.

Figure 8A:
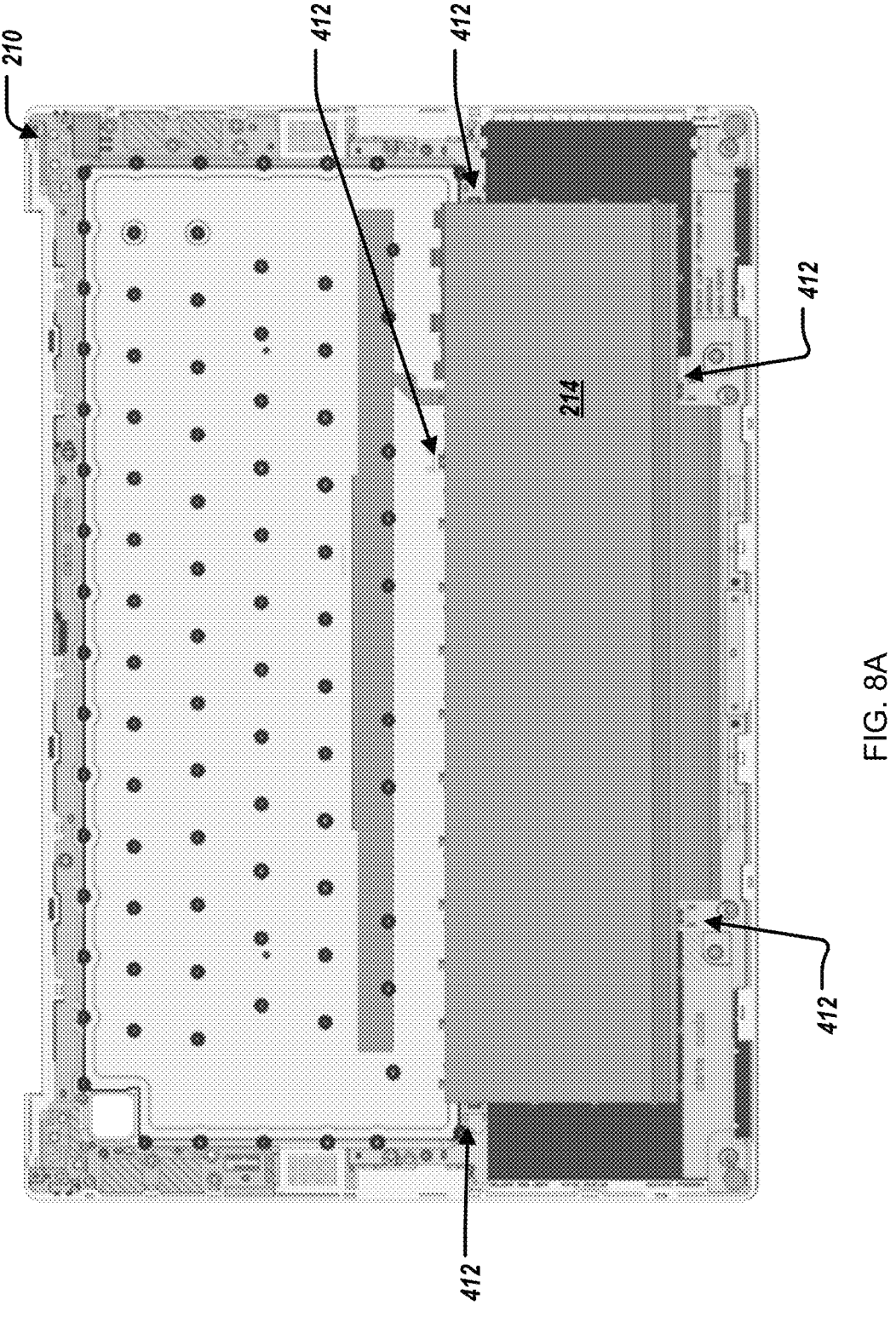

FIG. 8A illustrates a top down view of the computing module coupled to the cover structure.

Figure 8B:
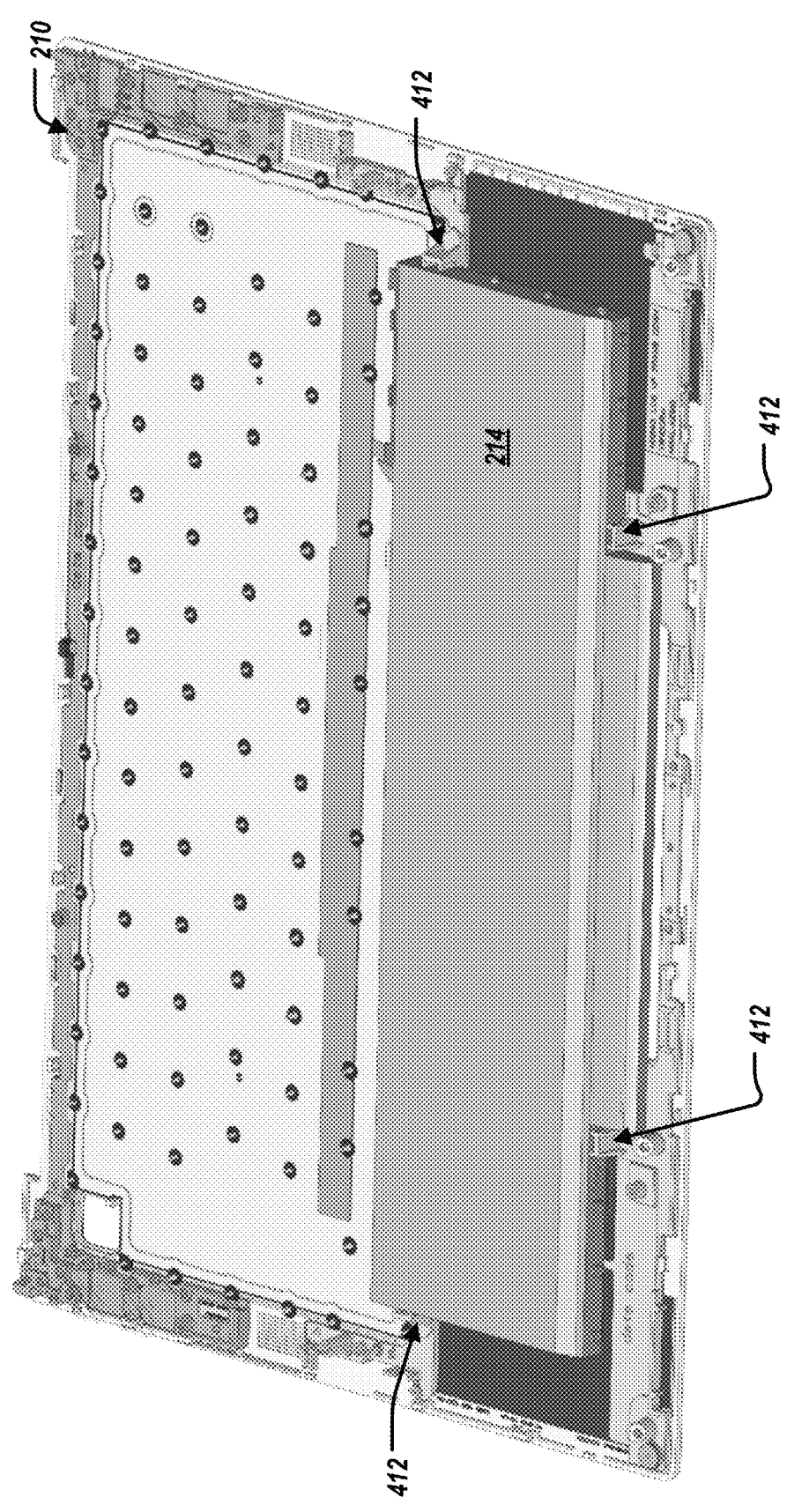

FIG. 8B illustrates a perspective view of the computing module coupled to the cover structure.

Figure 9:
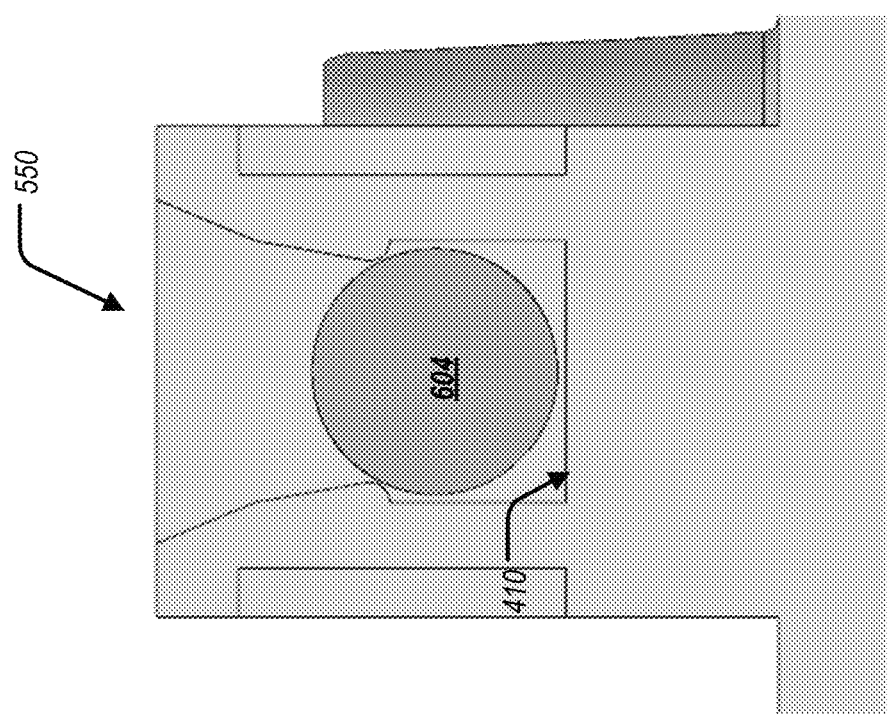

FIG. 9 illustrates a front view of the protruding member of the computing module coupled to the coupling member of the cover structure.

Figure 10:
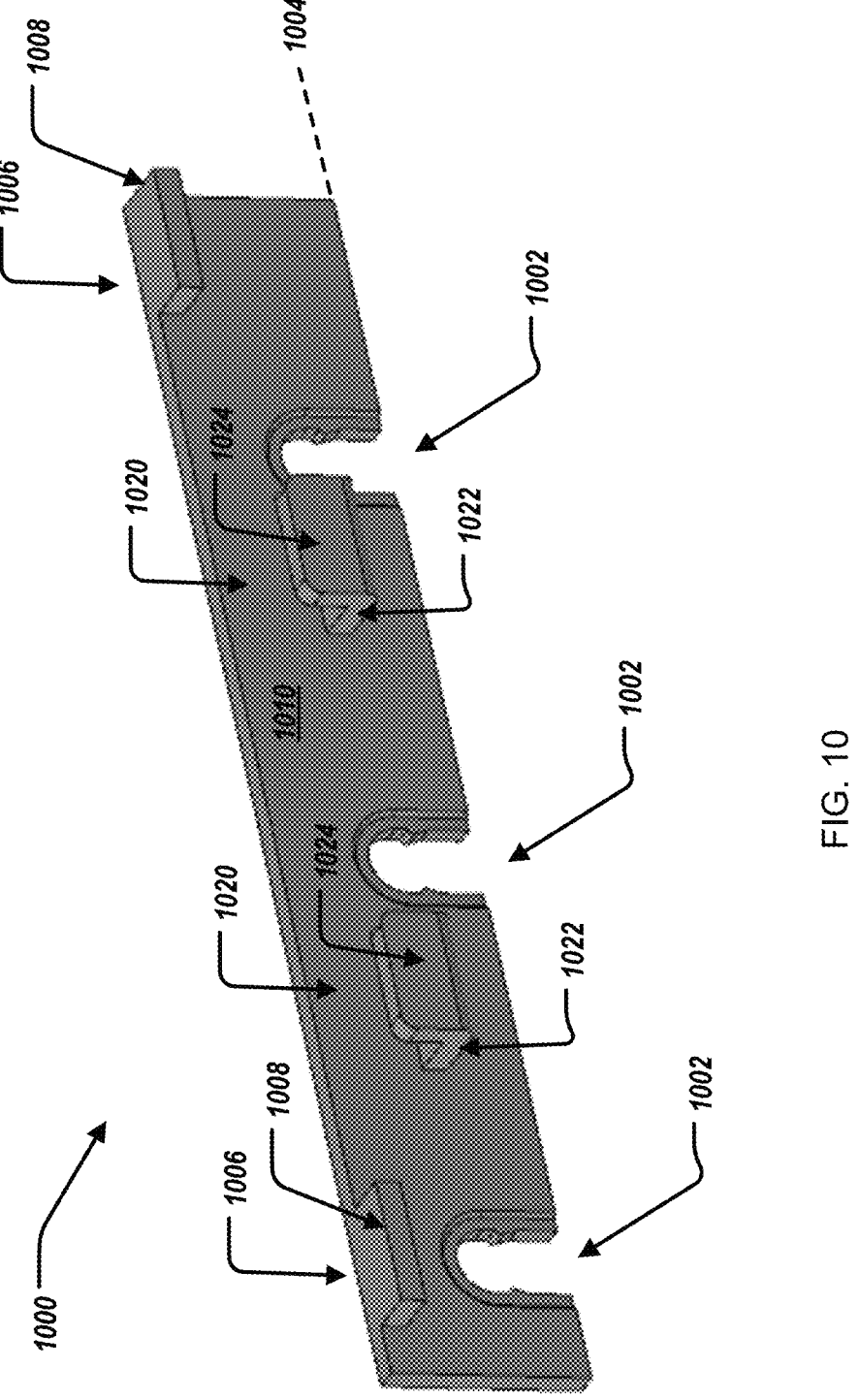

FIG. 10 illustrates a holder structure.

Figure 11:
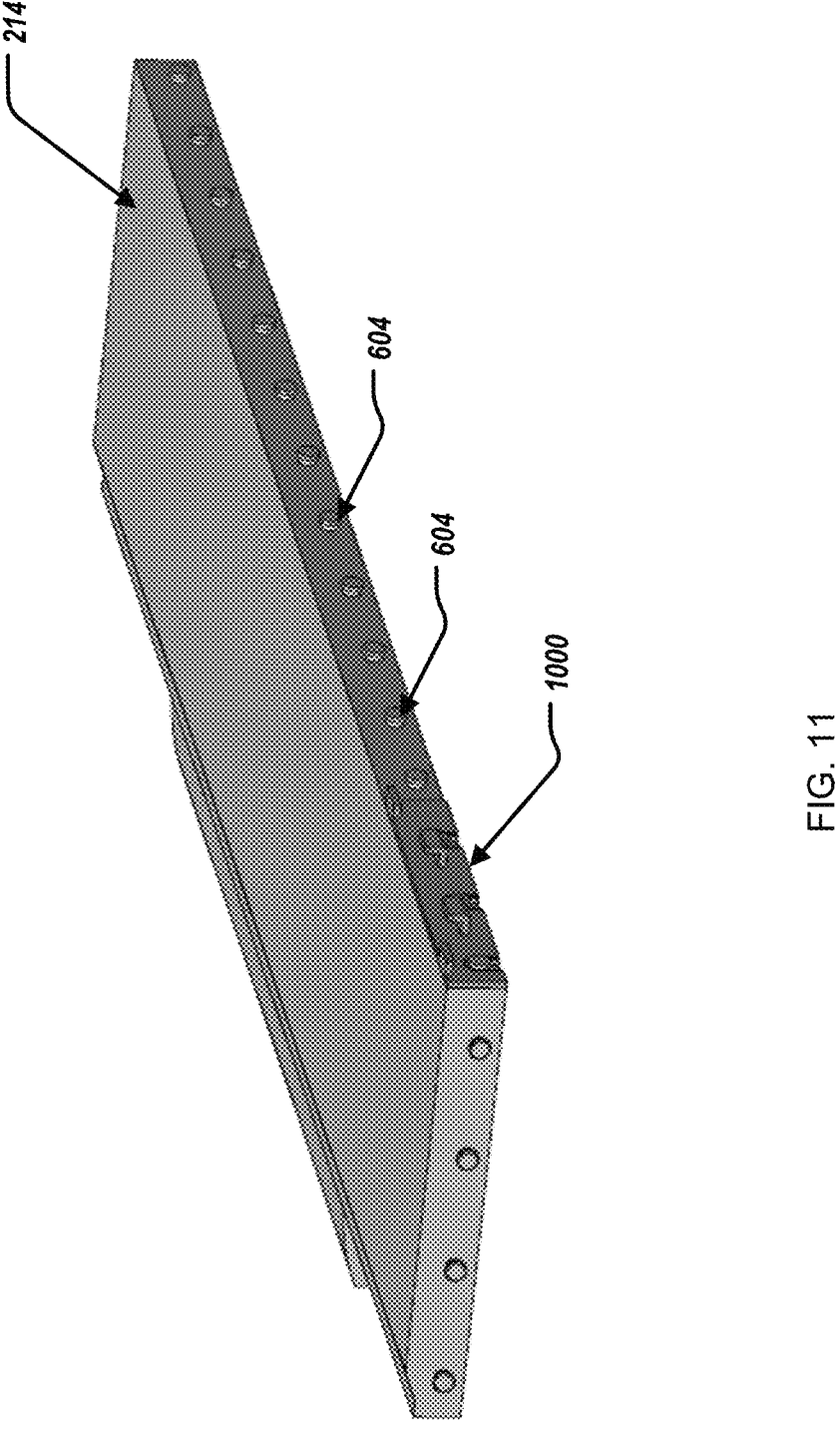

FIG. 11 illustrates the holder structure coupled to the computing module.

Figure 12:
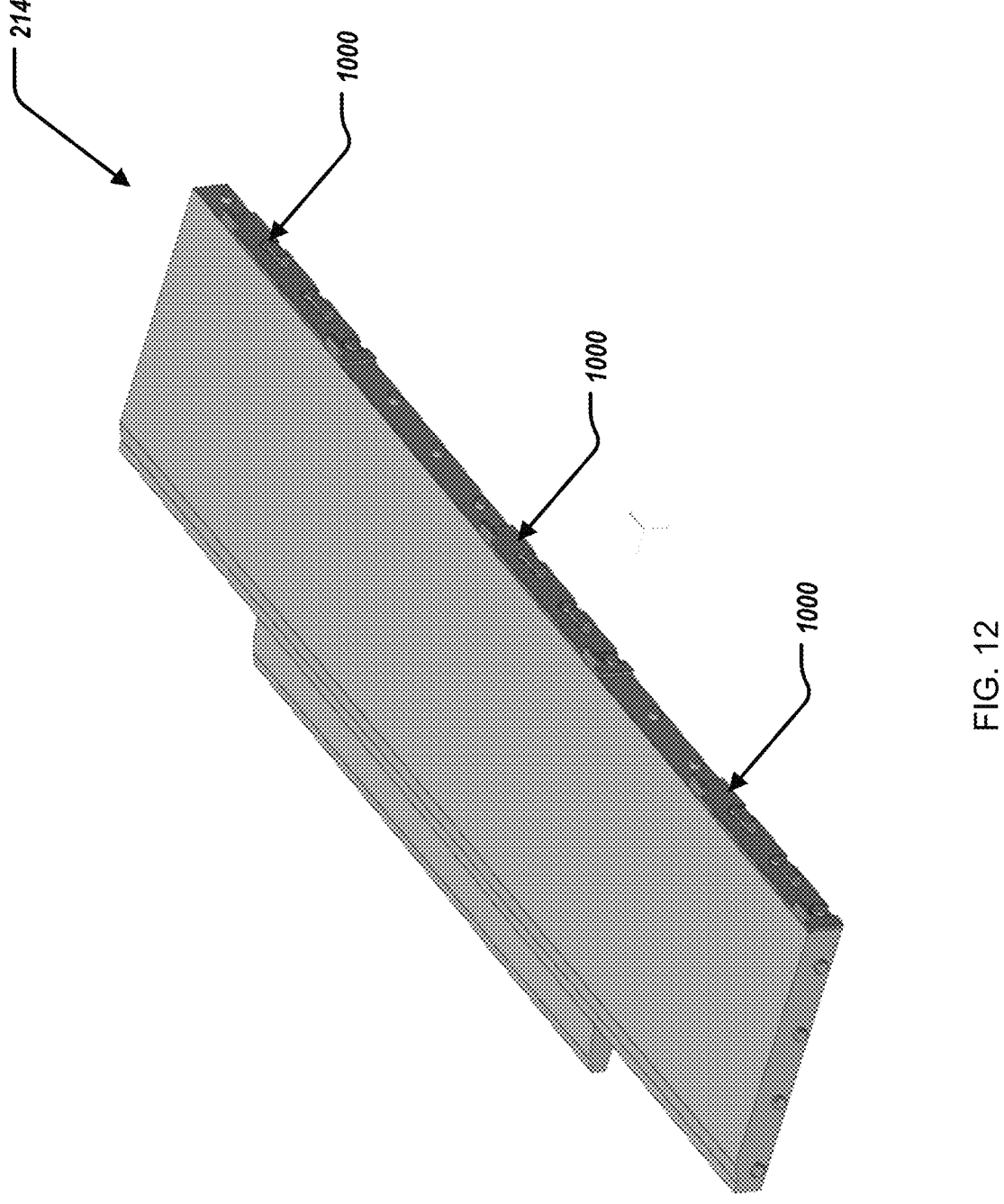

FIG. 12 illustrates a plurality of holder structures coupled to the computing module.

DESCRIPTION OF PARTICULAR
EMBODIMENT(S)

This disclosure discusses a coupling between a computing module and a cover structure of an information handling system. In short, a computing module of the information handling system can be coupled to a cover of the information handling system. The computing module can include protruding members and the cover can include coupling members. The protruding members of the computing module can be coupled to the coupling members of the cover such that the computing module is coupled to the cover. The computing module can include a battery.

Specifically, this disclosure discusses an information handling system, including a cover structure including a plurality of coupling members positioned on a surface of the cover structure, each of the coupling members defining a cavity; and a computing module having a perimeter and including a plurality of protruding members positioned on the perimeter, wherein each of a subset of the plurality of protruding members corresponds to a respective coupling member of the plurality of coupling members, wherein, when the computing module is coupled to the cover structure, each of subset of the plurality of protruding members is positioned with the cavity of the corresponding coupling member of the plurality of coupling members to maintain a positioning of the computing module with respect to the cover structure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-12 wherein like numbers are used to indicate like and corresponding parts.

Figure 1:
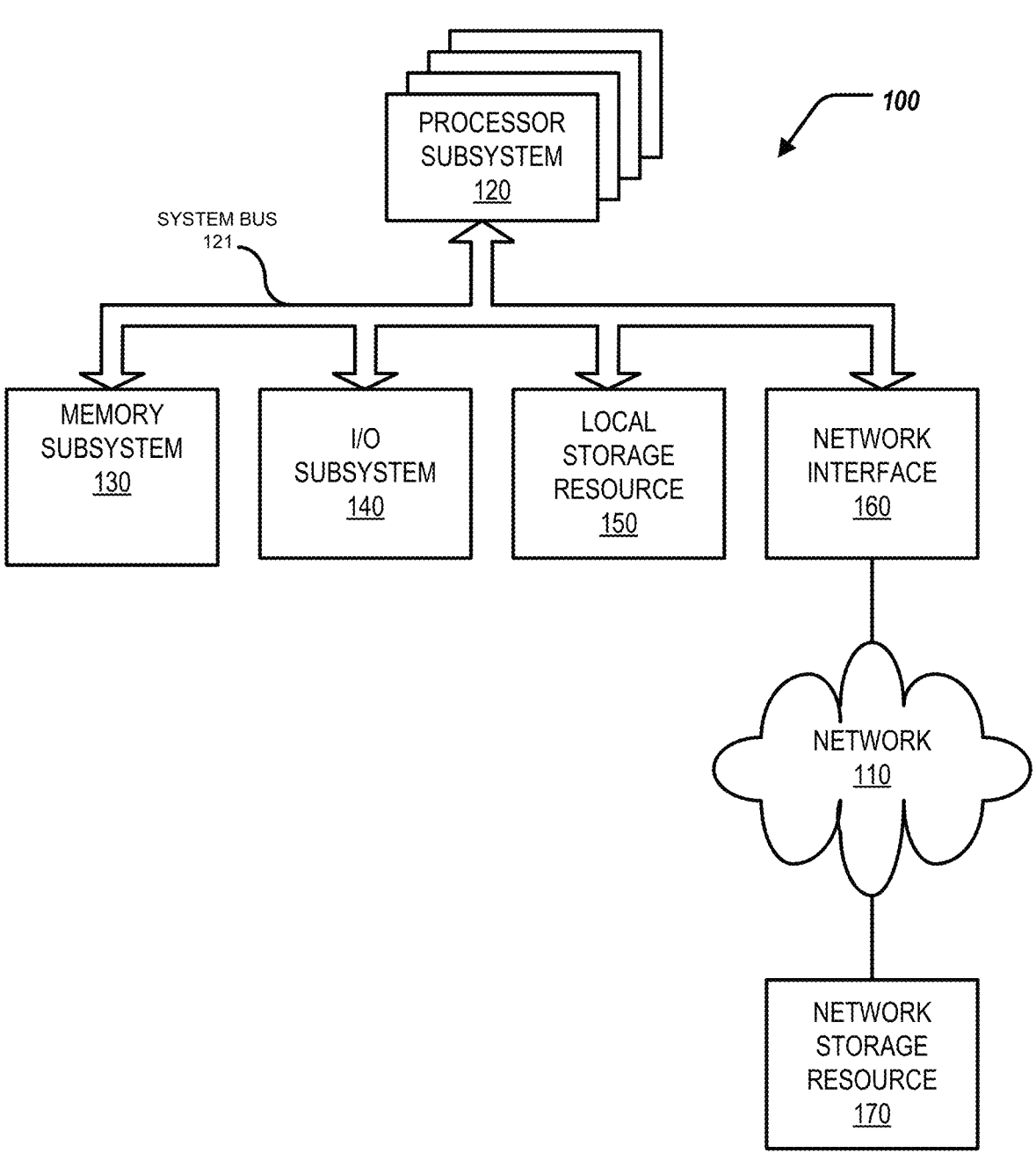
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, a computing module of the information handling system 100 can be coupled to a cover of the information handling system 100. The computing module can include protruding members and the cover can include coupling members. The protruding members of the computing module can be coupled to the coupling members of the cover such that the computing module is coupled to the cover.

Figure 2:
FIG. 2 illustrates a block diagram of an information handling system.
Figure 2:
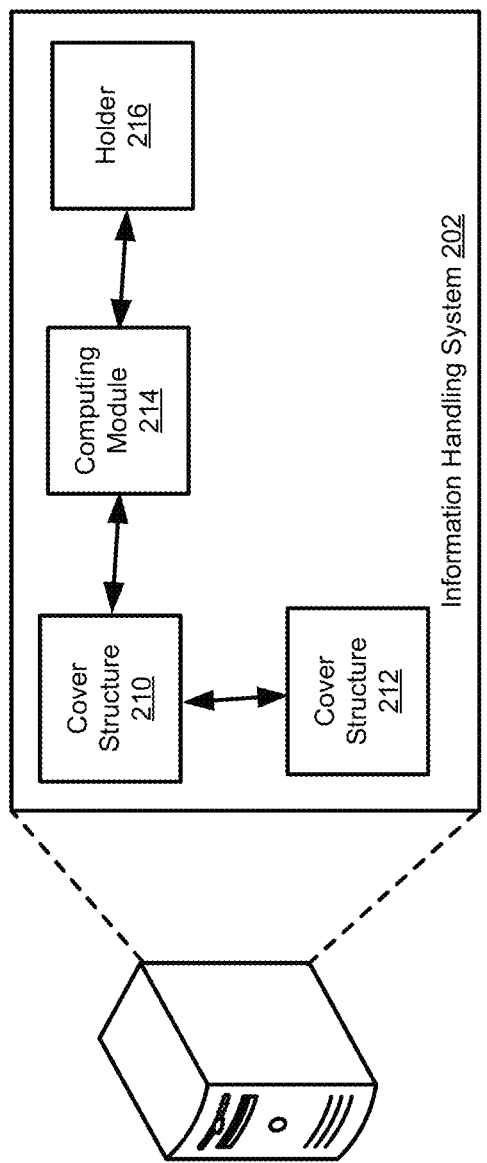

Turning to FIG. 2, FIG. 2 illustrates an environment 200 including an information handling system 202. The information handling system 202 can include cover structures 210, 212, a computing module 214, and a holder 216. In some examples, the information handling system 202 is similar to, or includes, the information handling system 100 of FIG. 1.

Figure 3:
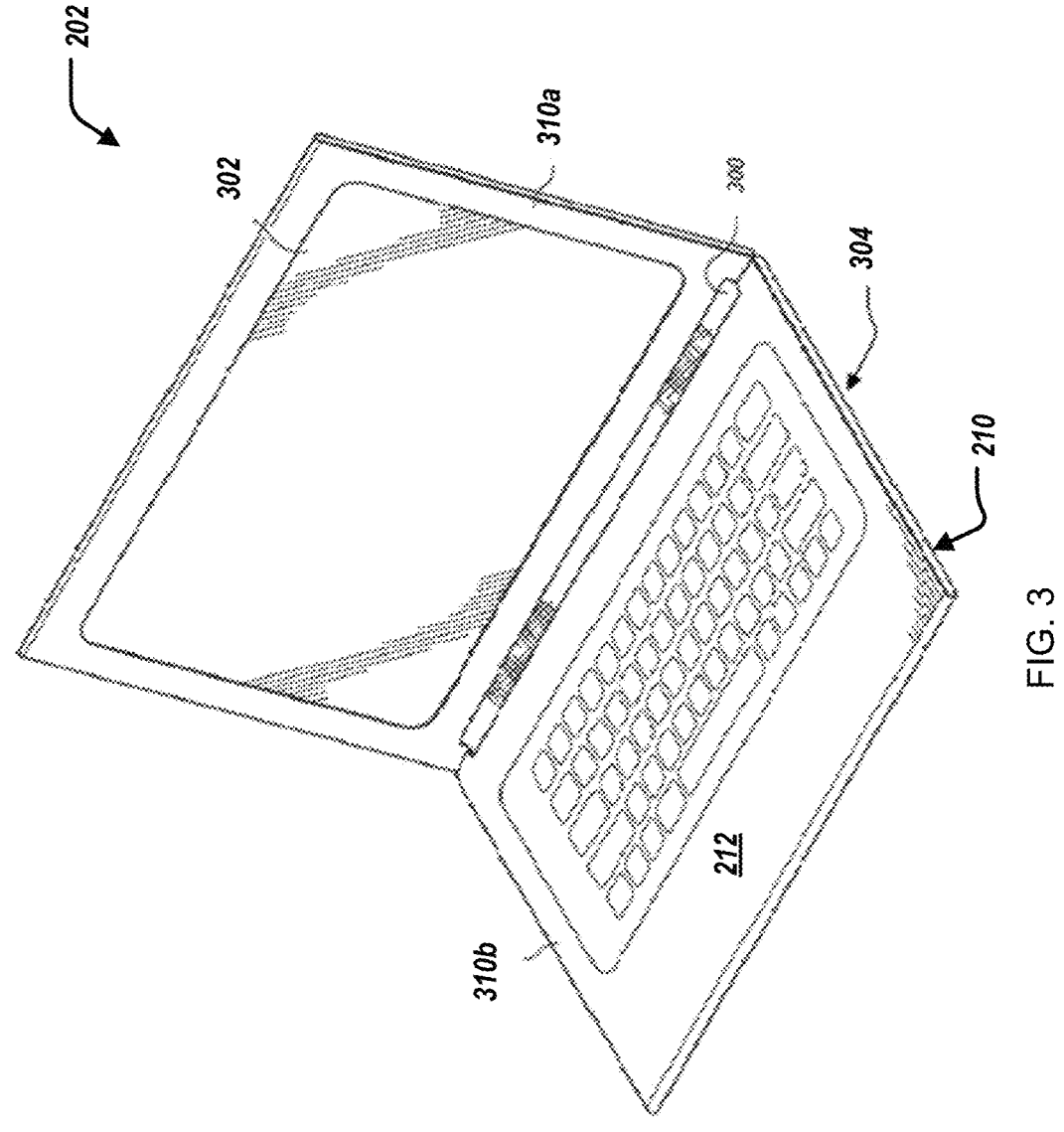
FIG. 3 illustrate a perspective view of the information handling system.

Turning now to FIG. 3, FIG. 3 illustrates the information handling system 202, shown as a dual-body (or two-body) information handling system 202. The information handling system 202 can include a first body 310a and a second body 310b. In some examples, the first body 310a can include a display 302 and the second body 310b can include a keyboard 304 (and typically also include computing components). The information handling system 202 can pivot about an axis provided by a hinge 300 that connects the bodies 310a, 310b, described further herein. That is, each body 310a, 310b can pivot about the axis of the hinge 300 with respect to the other body 310a, 310b.

The second body 310b can include the cover structures 210, 212.

Figure 4A:
FIG. 4A illustrates a perspective view of a cover structure of the information handling system.
Figure 4B:
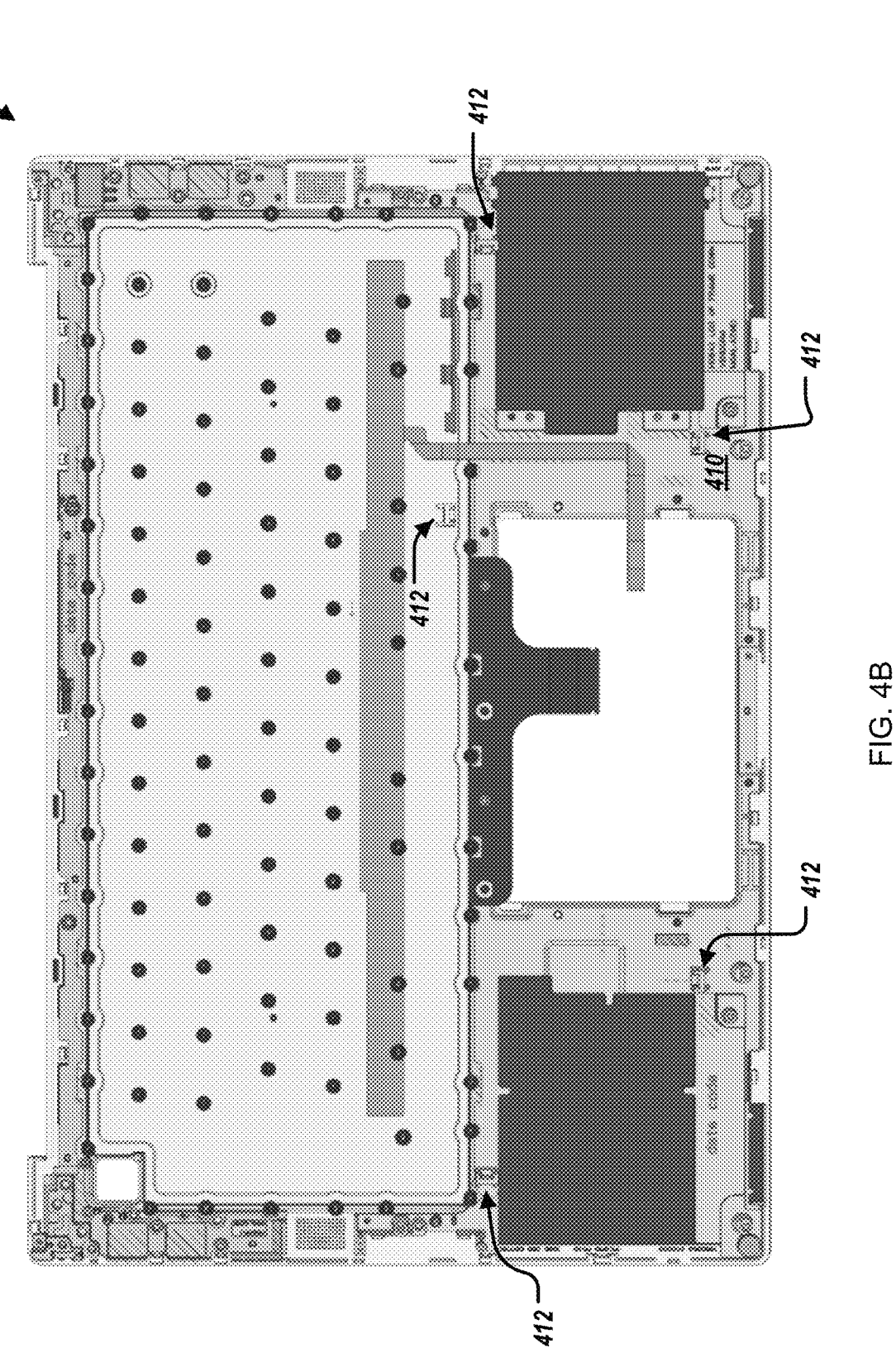
FIG. 4B illustrates a top down view of the cover structure of the information handling system.

FIG. 4A illustrates a perspective view of the cover structure 210; and FIG. 4B illustrates a top down view of the cover structure 210. Referring to FIGS. 4A, 4B, the cover structure 210 includes a surface 410 and a plurality of coupling members 412. The plurality of coupling members 412 are positioned on the surface 410 and can extend from the surface 410 (extend away from the surface 410). As illustrated, the cover structure 210 includes five coupling members 412; however, the cover structure 210 can include any number of coupling members 412 based on the application desired.

Figure 5A:
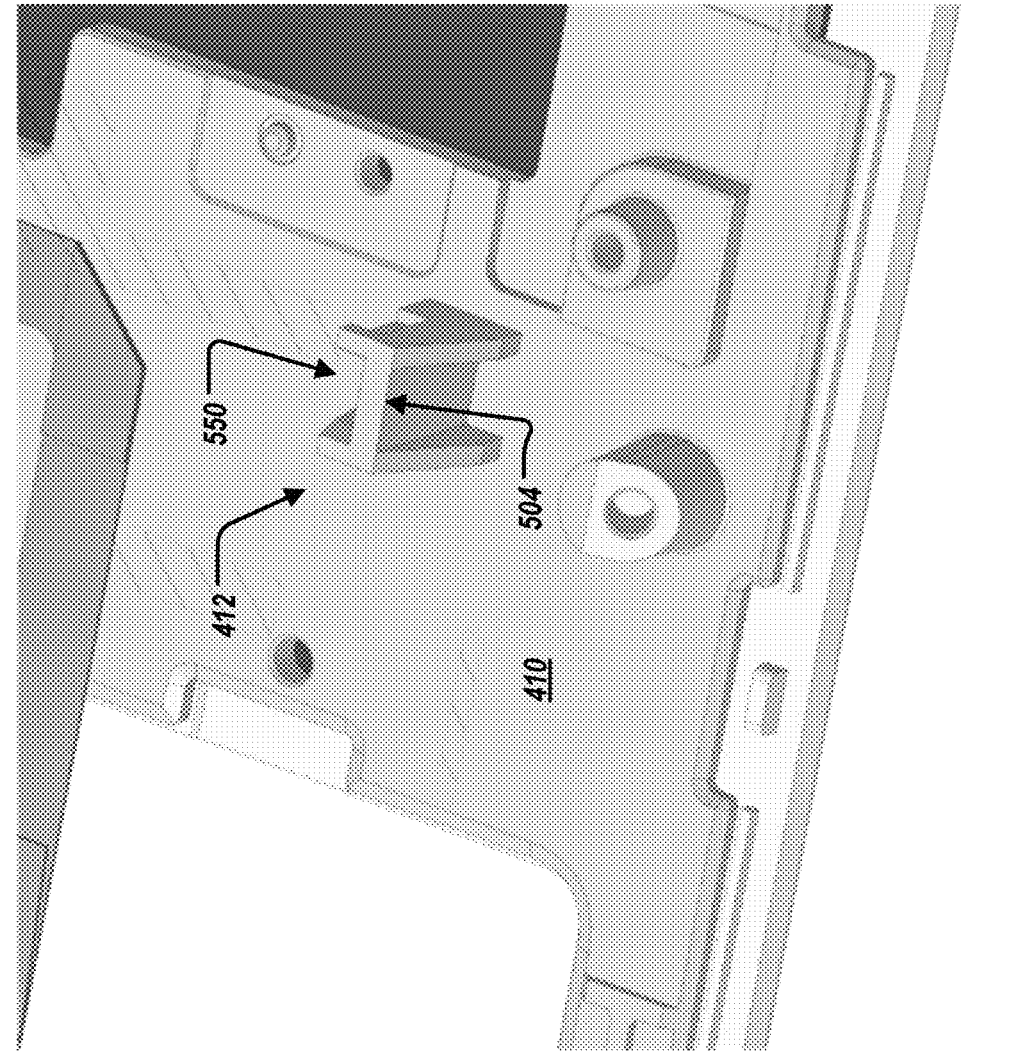
FIG. 5A illustrates a first perspective view of a coupling member of the cover structure.
Figure 5B:
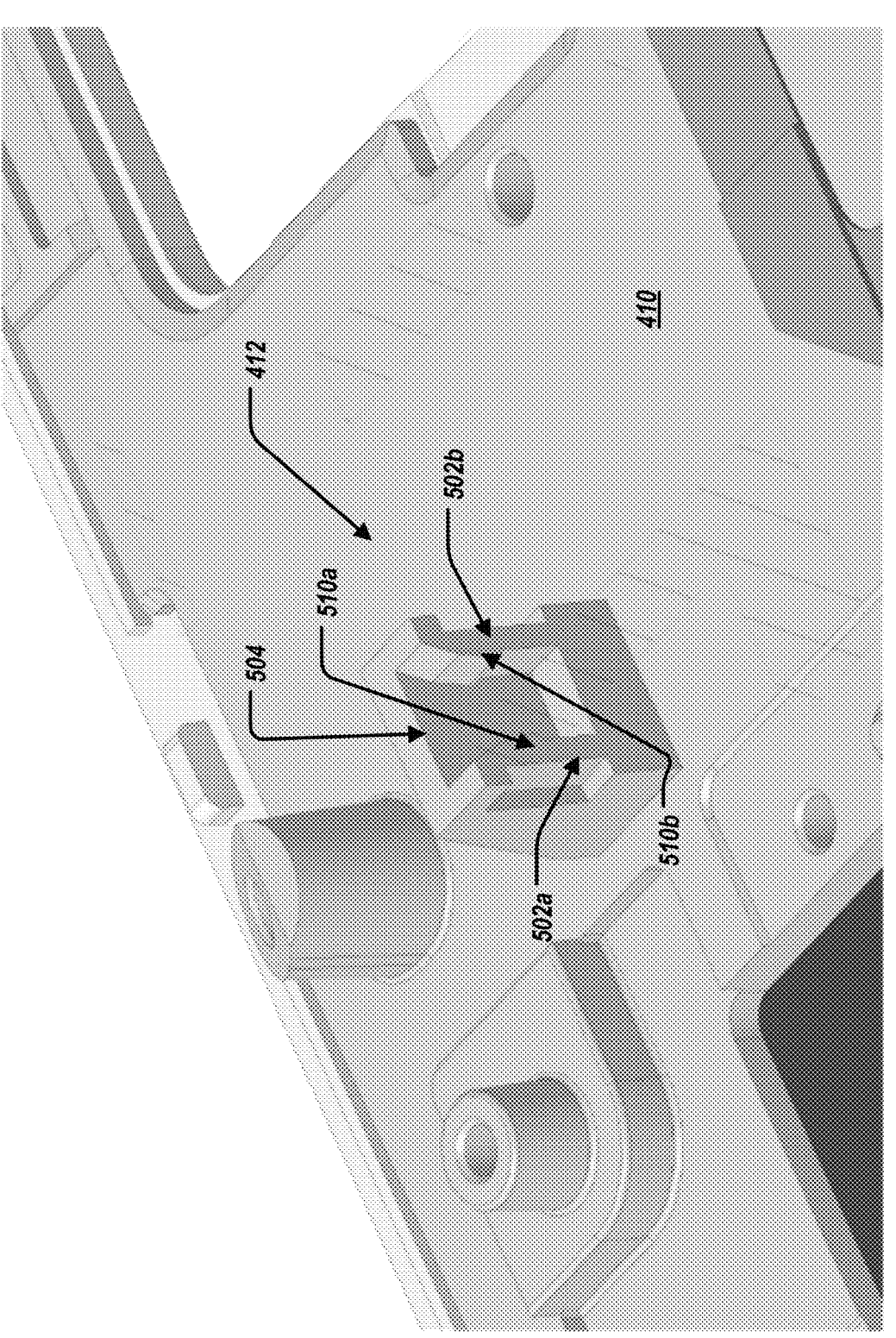
FIG. 5B illustrates a second perspective view of the coupling member of the cover structure.
Figure 5C:
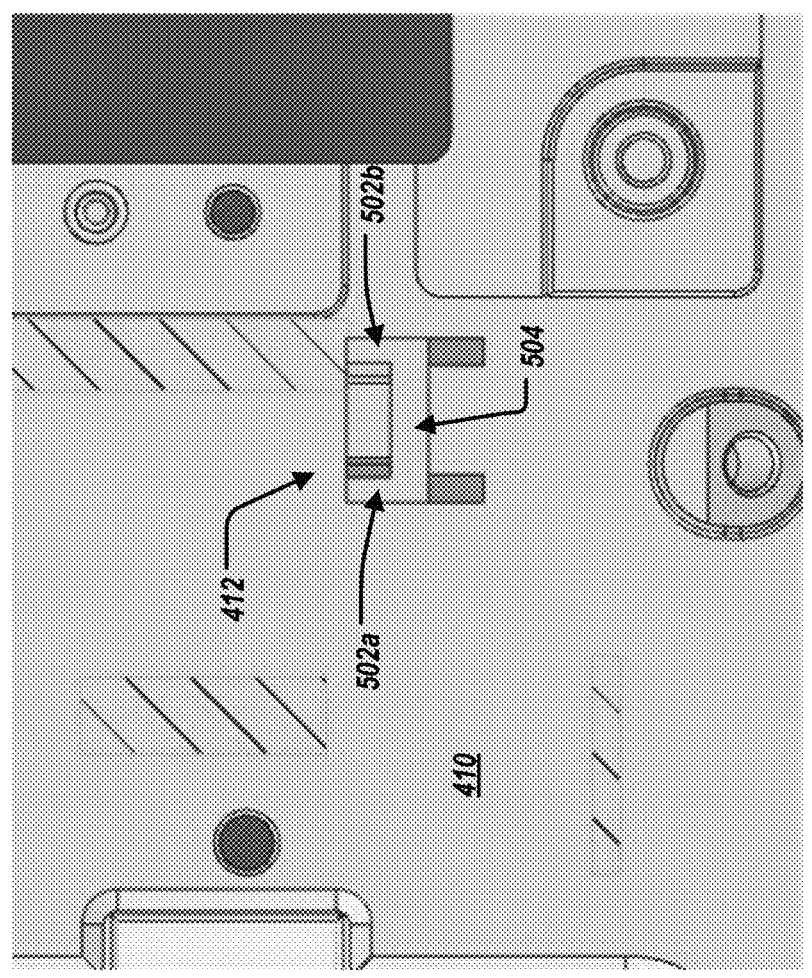
FIG. 5C illustrates a top down view of the coupling member of the cover structure.
Figure 5D:
FIG. 5D illustrates a front view of the coupling member of the cover structure.

FIG. 5A illustrates a first perspective view of the coupling member 412; FIG. 5B illustrates a second perspective view of the coupling member 412; FIG. 5C illustrates a top down view of the coupling member 412; and FIG. 5D illustrates a front view of the coupling member 412. Referring to FIGS. 5A-5D, the coupling member 412 can include a first member 502a and a second member 502b (collectively referred to as members 502). The first member 502a can be positioned opposite to the second member 502b. The members 502 can extend from the cover structure 410. The coupling member 412 can further include a back member 504.

The first member 502a can include a first projection 510a. The first projection 510a can include a sloped surface 512a extending from a top surface 514 of the coupling member 412 to an apex 516a of the first projection 510a. The first projection 510a can further include a locking surface 518a between the apex 516a and a sidewall surface 518a of the first projection 510a. The second member 502b can include a second projection 510b. The second projection 510b can include a sloped surface 512b extending from the top surface 514 of the coupling member 412 to an apex 516b of the second projection 510b. The second projection 510b can further include a locking surface 518b between the apex 516b and a sidewall surface 518b of the second projection 510b. The first projection 510a faces the second projection 510b.

In some examples, the first projection 210a is spaced-apart a distance M1 from the second projection 210b. In particular, the apex 516a of the first projection 210a is spaced-apart the distance M1 from the apex 516b of the second projection 210b.

In some examples, the first member 502a and the second member 502b are flexible. That is, the members 502 are formed from a flexible material. For example, the first member 502a is flexible in the direction D1—that is, in response to a force, the first member 502a is able to be flexed in the direction D1. For example, the second member 502b is flexible in the direction D2—that is, in response to a force, the second member 502b is able to be flexed in the direction D2.

To that end, the coupling member 410 can define a cavity 550. In some examples, the cavity 550 is defined between the members 502 and the back member 504. The cavity 550 can be an opening or a space or a void that is defined between the members 502 and the back member 504.

Figure 6A:
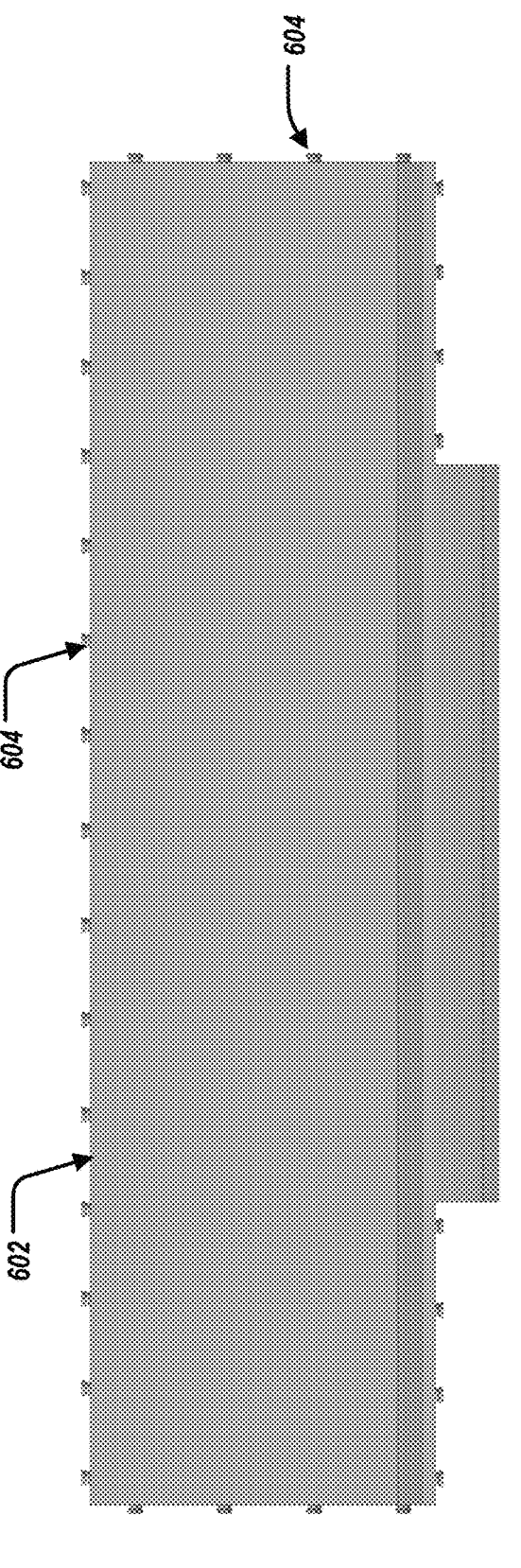
FIG. 6A illustrates a top down view of a computing module.
Figure 6B:
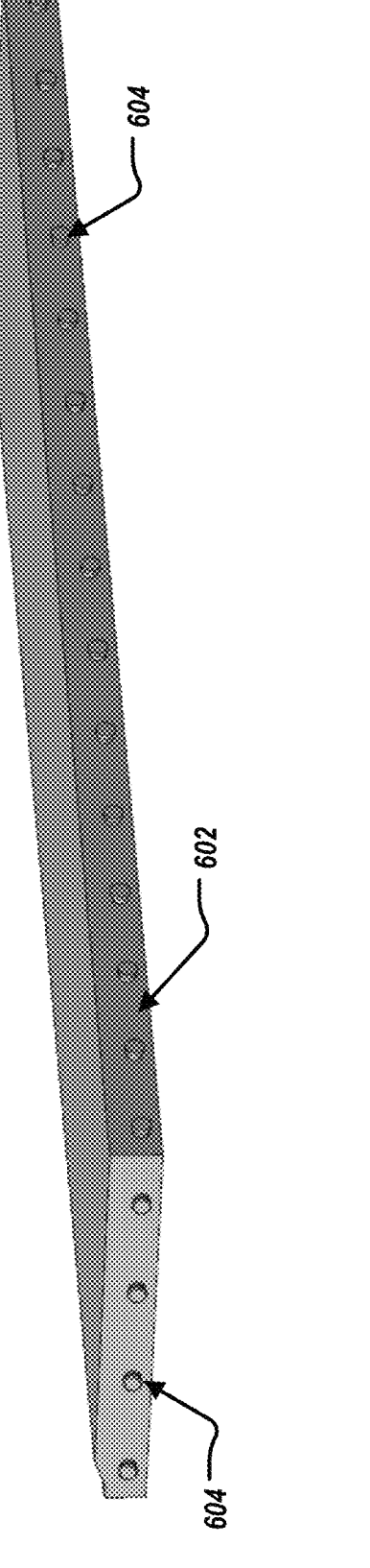
FIG. 6B illustrates a perspective view of the computing module.

FIG. 6A illustrates a top down view of the computing module 214; and FIG. 6B illustrates a perspective view of the computing module 214. Referring to FIGS. 6A, 6B, the computing module 214 can have a perimeter 602. In some examples, the computing module 214 is a battery (rechargeable battery). In some examples, the computing module 214 is any computing apparatus for use in the information handling system 202.

The computing module 214 can include a plurality of protruding members 604 positioned on the perimeter 602 of the computing module 214 (extending from the perimeter 602 of the computing module 214). In some examples, only a portion of the perimeter 602 includes protruding members 604. In some examples, an entirety of the perimeter 602 includes (spaced-apart) protruding members 604.

FIG. 7A illustrates a close-up top-down perspective of a portion of the computing module 214; and FIG. 7B illustrates a close-up perspective view of the computing module 214. Referring to FIGS. 7A, 7B, the protruding member 604 can include a head 702 positioned on a cylindrical member 704. In some examples, the head 702 is disc-shaped. The head 702 can have a first diameter P1, and the cylindrical member 704 can have a second diameter P2. In some examples, the first diameter P1 of the head 702 can be greater than the second diameter P2 of the cylindrical member 704. In some examples, the head 702 can be spaced-apart from a surface 710 of the computing module 214 a distance N1.

In some example, the first diameter P1 of the head 702 is greater than the distance M1 between the first projection 210a and the second projection 210b (when the projections 210 are in an "un-flexed" or nominal state). That is, the distance M1 between the first projection 210a and the second projection 210b is less than the diameter P1 of the head 702.

In some examples, a pitch (or distance) between each of the protruding members 602 is substantially the same. In some examples, a pitch (or distance) between each of a subset of the protruding members 602 is substantially the same.

FIG. 8A illustrates a top down view of the computing module 214 coupled to the cover structure 210; FIG. 8B illustrates a perspective view of the computing module 214 coupled to the cover structure 210; and FIG. 9 illustrates a front view of the protruding member 604 coupled to the coupling member 412. Referring to FIGS. 8A, 8B, 9, each of a subset of the protruding members 604 corresponds to a respective coupling member 412. That is, when the computing module 214 is coupled to the cover structure 210, each of the subset of the protruding members 604 is coupled to a respective coupling member 412, and in particular, each of the subset of the protruding members 604 is positioned within the cavity 550 of the corresponding coupling member 412.

Referring to FIGS. 5 and 9, in some examples, when the computing module 214 is coupled to the cover structure 210, the protruding member 604 can be inserted into the cavity 550 along the direction R1. The protruding member 604 can initially contact the angled surfaces 512a, 512b, and upon contact with the apexes 516a, 516b, the members 502a, 502b flex along the directions D1, D2, respectively, in response to the protruding member 604 inserted along the direction R1. In response to such flexing of the members 502a, 502b along the directions D1, D2, respectively, the head 702 of the protruding member 604 flexes the members 502a, 502b such that a distance therebetween is temporarily greater than the diameter P1 of the head 702 of the protruding member 604. When the distance between the members 502a, 502b is temporarily greater than the diameter P1 of the head 702 of the protruding member 604, the protruding member 604 is able to be fully positioned within the cavity 550 such that the head 702 of the protruding member 604 contacts the surface 410 of the cover structure 210 (or is proximate to the surface 410 of the cover structure 210).

Furthermore, the protruding member 604 is positioned within the cavity 550 and between the first projection 510a and the second projection 510b. Once the head 702 of the protruding member 604 contacts the surface 410 of the cover structure 210 (or is proximate to the surface 410 of the cover structure 210), the members 502a, 502b can flex back to a nominal state (e.g., such that the distance therebetween is the distance M1). Moreover, when the protruding member 604 is positioned within the cavity 550, the projections 510a, 510b maintain the positioning of the protruding member 604 within the cavity 550. Specifically, when the protruding member 604 is positioned within the cavity 550 the locking surfaces 518a, 518b of the projections 510a, 510b, respectively, maintain the positioning of the protruding member 604 within the cavity 550.

To that end, when each of the subset of the protruding members 604 is positioned within the cavity 550 of the corresponding coupling member 412, the positioning of the computing module 214 is maintained with respect to the cover structure 210. Specifically, when the protruding member 604 is positioned within the cavity 550, the locking surfaces 518*a*, 518*b* of the projections 510*a*, 510*b*, respectively, maintain the positioning of the protruding member 604 within the cavity 550 such that the positioning of the computing module 214 is maintained with respect to the cover structure 210.

FIG. 10 illustrates a holder structure (or holder) 1000. The holder 1000 can be removably coupled to the computing module 214, as shown in FIGS. 11 and 12. The holder 1000 can include a plurality of notches 1002. As illustrated, the holder 1000 includes three notches 1002; however, the holder 1000 can include any number of notches 1002. The notches 1002 can be positioned along a first side 1004 of the holder 1000. The holder 1000 can further include a plurality of tabs 1006 having a first body 1008 extending from a surface 1010 of the holder 1000. The holder 100 can further include a plurality of tabs 1020 having a first body 1022 extending from the surface 1010 of the holder 100, and further including a second body 1024 extending perpendicular to the first body 1022

Referring to FIGS. 10, 11 the holder 1000 can be coupled to the computing module 214. Specifically, when the holder 1000 is coupled to the computing module 214, the notches 1002 are coupled to one or more of the protruding members 604. Specifically, when the notches 1002 are coupled to a subset of the protruding members 604, the holder 1000 is coupled between the head 702 of the protruding member 604 and the computing module 214. The holder 1000 is positioned within the distance N1 defined between the head 702 and the surface 710 of the computing module 214, shown in FIG. 7A. That is, the holder 1000 is "inserted" onto the protruding members 604 such that holder "fits" between the head 702 of the protruding members 604 and the computing module 214.

The holder 1000 can be utilized for multiple purposes, such as cable routing, support functions, or fix functions.

The holder 1000 can be positioned anywhere along the computing module 214 depending on the application desired. Further, multiple holders 1000 can be coupled to the computing module 214, as shown in FIG. 12.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system, comprising:
a cover structure including a plurality of coupling members positioned on a surface of the cover structure, each of the coupling members defining a cavity; and
a computing module having a perimeter and including a plurality of protruding members positioned on the perimeter, wherein each of a first subset of the plurality of protruding members corresponds to a respective coupling member of the plurality of coupling members,
a holder structure that is removably couplable to the computing module, the holder structure including:
a first side and a second side positioned opposite to the first side and facing a first direction toward the computing module,
a first edge and a second edge positioned opposite to the first edge, the first edge and the second edge positioned between the first side and the second side, the first edge including a plurality of notches disposed along the first edge of the holder structure and extending through the first and second sides and from the first edge such that a respective gap is defined by each notch of the plurality of notches at the first edge,
a first tab including a first body extending from the first side in a second direction, opposite the first direction, extending perpendicular to the first side at the second edge, and terminating at a first surface that is parallel to the first side,
a second tab including:
a second body extending from the first side in the second direction, and extending perpendicular to the first side between the first edge and the second edge, and
a third body extending from a distal end of the second body, extending perpendicular to the second body, and extending parallel to the first surface,
wherein, when the computing module is coupled to the cover structure, each of the first subset of the plurality of protruding members is positioned with the cavity of the corresponding coupling member of the plurality of coupling members to maintain a positioning of the computing module with respect to the cover structure.

2. The information handling system of claim 1, wherein each coupling member of the plurality of coupling members include a first member and a second member, the first member positioned opposite to the second member, the first member and the second member extending from the cover structure, wherein the first member includes a first projection and the second member includes a second projection, the first projection facing the second projection.

3. The information handling system of claim 2, wherein, when the computing module is coupled to the cover structure, each of the first subset of the plurality of protruding members is positioned within the cavity of the corresponding coupling member of the plurality of coupling members and between the first projection of the first member and the second projection of the second member of the corresponding coupling member.

4. The information handling system of claim 3, for each protruding member positioned within the cavity of the corresponding coupling member, the first projection of the first member and the second projection of the second member maintain the positioning of the protruding member within the cavity.

5. The information handling system of claim 4, wherein each protruding member includes a respective head positioned on a respective cylindrical member, wherein a distance between the first projection of the first member and the second projection of the second member is less than a diameter of the head of each protruding member.

6. The information handling system of claim 5, wherein the first member and the second member are flexible.

7. The information handling system of claim 1, wherein the computing module is a battery.

8. The information handling system of claim 1, wherein when the holder structure is coupled to the computing module, the plurality of notches are coupled to one or more of the protruding members.

9. The information handling system of claim 8, wherein each of the protruding members includes a respective head positioned on a respective cylindrical member, the head having a first diameter greater than a second diameter of the cylindrical member, wherein when the holder structure is coupled to the computing module, the holder structure is coupled between the head of a second subset of the protruding members and the computing module.

10. The information handling system of claim 1, wherein a pitch between each of the plurality of protruding members is substantially the same.

11. An information handling system, comprising:
a cover structure including a plurality of coupling members positioned on a surface of the cover structure, each of the coupling members defining a cavity;
a battery having a perimeter and including a plurality of protruding members positioned on the perimeter, wherein each of a first subset of the plurality of protruding members corresponds to a respective coupling member of the plurality of coupling members; and
a holder structure that is removably couplable to the battery to provide cable routing, the holder structure including:
a first side and a second side positioned opposite to the first side and facing a first direction toward the battery,
a first edge and a second edge positioned opposite to the first edge, the first edge and the second edge positioned between the first side and the second side, the first edge including a plurality of notches disposed along the first edge of the holder structure and extending through the first and second sides and from the first edge such that a respective gap is defined by each notch of the plurality of notches at the first edge,
a first tab including a first body extending from the first side in a second direction, opposite the first direction, extending perpendicular to the first side at the second edge, and terminating at a first surface that is parallel to the first side,
a second tab including:
a second body extending from the first side in the second direction, and extending perpendicular to the first side between the first edge and the second edge, and
a third body extending from a distal end of the second body, extending perpendicular to the second body, and extending parallel to the first surface;
wherein, when the battery is coupled to the cover structure, each of the first subset of the plurality of protruding members is positioned with the cavity of the corresponding coupling member of the plurality of coupling members to maintain a positioning of the battery with respect to the cover structure.

12. The information handling system of claim 11, wherein each coupling member of the plurality of coupling members include a first member and a second member, the first member positioned opposite to the second member, the first member and the second member extending from the cover structure, wherein the first member includes a first projection and the second member includes a second projection, the first projection facing the second projection.

13. The information handling system of claim 12, wherein, when the battery is coupled to the cover structure, each of the first subset of the plurality of protruding members is positioned within the cavity of the corresponding coupling member of the plurality of coupling members and between the first projection of the first member and the second projection of the second member of the corresponding coupling member.

14. The information handling system of claim 13, for each protruding member positioned within the cavity of the corresponding coupling member, the first projection of the first member and the second projection of the second member maintain the positioning of the protruding member within the cavity.

15. The information handling system of claim 14, wherein each protruding member includes a respective head positioned on a respective cylindrical member, wherein a distance between the first projection of the first member and the second projection of the second member is less than a diameter of the head of each protruding member.

16. The information handling system of claim 15, wherein the first member and the second member are flexible.

17. The information handling system of claim 11, wherein a pitch between each of the plurality of protruding members is substantially the same.

* * * * *